G. W. BROWN.
Ice-Cream Freezer.

No. 42,744.          Patented May 17, 1864.

Witnesses:
Lemuel W. Serrell
Thos. S. Harold

Inventor:
Geo. W. Brown

UNITED STATES PATENT OFFICE.

GEORGE W. BROWN, OF NEW YORK, N. Y.

IMPROVED ICE-CREAM FREEZER.

Specification forming part of Letters Patent No. 42,744, dated May 17, 1864.

*To all whom it may concern:*

Be it known that I, GEORGE W. BROWN, of the city and State of New York, have invented, made, and applied to use a certain new and useful Improvement in Ice-Cream Freezers; and I do hereby declare the following to be a full, clear, and exact description of my said invention, reference being had to the annexed drawings, making part of this specification, wherein—

Figure 1:
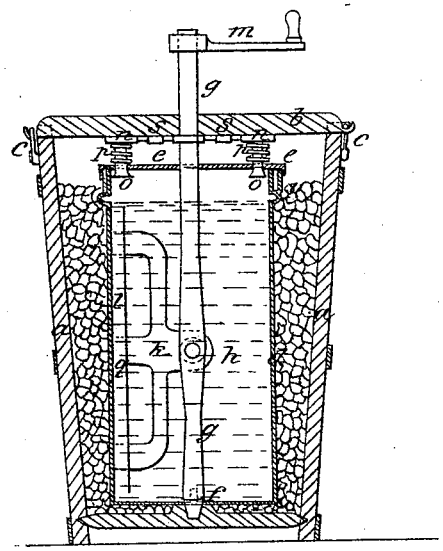
Figure 2:
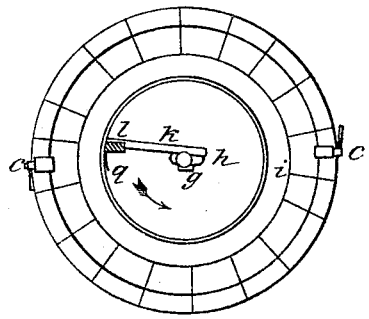
Figure 3:
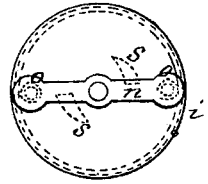

Figure 1 is a vertical section of my improved freezer. Fig. 2 is a plan of said freezer with the covers removed, and Fig. 3 is a plan of the cover of the cream-can.

Similar marks of reference denote the same parts.

Ice-cream freezers have heretofore been made with a spring-scraper to remove the frozen cream from the inside of the can; but said springs are liable to injury, and are difficult to keep clean. Freezers have also been made in such a manner that when the handle is turned in one direction the cream-can will be held stationary, while the scraper is revolved and scrapes off the frozen cream, and when the handle is revolved in the opposite direction the scraper and can will be rotated together in the frigorific material.

The nature of my said invention consists in a scraper kept toward the cream-can by the leverage of the handle by which said scraper is rotated, and in combination therewith of stops so applied that the can and scraper can be turned together, or the can held stationary while the scraper is revolved within said can.

In the drawings, $a$ is a pail or tub, with a cover, $b$, that is retained in place by hooks $c\ c$.

$d$ is the cream-can, with a cover, $e$, that is kept from turning separately from the can by a projection or locking-pin at $i$.

$f$ is a center secured in the bottom of the cream-can, taking a hole in the center of the pail-bottom, and $g$ is a vertical spindle passing through the covers $b$ and $e$ and setting upon the pin $f$, where it projects at the inside of the can-bottom. This spindle $g$ is not made in one piece, but is jointed at $h$, at which point also the stock $k$ of the scraper $l$ is attached.

$m$ is the handle on the upper end of $g$, and on the opposite side to the scraper $l$, so that the scraper will be kept against the inside of the cream-can by the act of pressing slightly down upon the crank handle in the act of turning, which operation tends to bend the stem at the joint $h$, and thereby keep the scraper in close contact with the side of the can. The head or cover $e$ of the cream-can is fitted with a cross bar, $n$, that has studs $o\ o$, passing through holes in said cover, and $p\ p$ are spiral springs pressing the said cross-bar to the under side of the cover $b$ of the pail or tub $a$, and $s\ s$ are inclined lugs secured to the under side of said cover $b$, so that when the can $d$, cover $e$, and bar $n$ are rotated in one direction the bar will slide under the inclines $s$, compressing the springs $p\ p$; but on attempting to turn the cream-can $d$, cover $e$, and bar $n$ in the opposite direction the bar $n$ will stop against the ends of said lugs $s$, and hold the can stationary, while the scraper $l$ removes the cream that is frozen to the inside of the can, in doing which said scraper rides over an inclined lug, $q$, in the direction indicated by the arrow, Fig. 2; but this same lug, $q$, is the means for rotating the cream-can when the scraper is turned in the other direction to take the square end of said lug $q$.

What I claim, and desire to secure by Letters Patent, is—

1. Pressing the scraper to the interior surface of the cream can by leverage derived from the handle or crank, substantially as specified.

2. The stops $q$ and $s\ s$, in combination with the spring cross-bar $n$ and scraper $l$, substantially as and for the purposes specified.

In witness whereof I have hereunto set my signature this 16th day of April, 1864.

GEO. W. BROWN.

Witnesses:
 LEMUEL W. SERRELL,
 THOS. GEO. HAROLD.